IMPEDANCE ELEMENT WITH ALLOY CONNECTOR

Filed April 7, 1964

INVENTOR.
DAVID A. LUPFER
BY
ATTORNEYS

United States Patent Office 3,310,718
Patented Mar. 21, 1967

3,310,718
IMPEDANCE ELEMENT WITH ALLOY CONNECTOR
David A. Lupfer, Metuchen, N.J., assignor to Nytronics, Inc., Phillipsburg, N.J., a corporation of New Jersey
Filed Apr. 7, 1964, Ser. No. 358,017
7 Claims. (Cl. 317—258)

This invention relates to an article of manufacture comprising a wrought heat resistant alloy electrical connector and also to an electronic component comprising an electrically conductive element having a lead wire or connector extending therefrom formed of a wrought silver-base alloy characterized by a desirable combination of physical properties at elevated fabrication temperatures.

In making lead connections or fastenings to electronic parts, tinned copper wire is commonly used. Silver or gold plated alloy wire is also used, the alloy wire comprising principally a copper clad iron and nickel alloy exhibiting good weldability and stiffness. However, wires of the foregoing materials have their limitations at elevated fabrication temperatures up to and over 700° C. in that they tend to oxidize and fail at these temperatures. This is especially true for silver plated alloy wire in that oxidation would apparently proceed through faults in the coating to the underlying material whereby the plating would peel off.

In order to provide a miniaturized impedance component, such as a capacitor, which will be reliable under severe environmental conditions, it must be isolated from the detrimental effects of the various harmful elements in the atmosphere. In producing small capacitors, a thin wafer of an inorganic dielectric material, such as a ceramic, a single crystal or a composite inorganic material capable of withstanding high temperatures during processing, is provided as a substrate upon which is deposited a metallic layer, e.g. silver, on opposite sides thereof. Leads are then connected to the metallic layer and the whole unit then baked at a predetermined elevated tempertaure to bake out any occluded gases and trapped water molecules. Where the metallic layer is applied as a paint-on mixture of metal and glass particles, the baking is carried out in an oxidizing atmosphere at about 500° C. to 900° C. to insure adherence of the metallic layer to the ceramic. Under such conditions, lead connectors, such as silver, tinned copper and the like, are generally adversely affected. Silver tends to soften, lose its strength and fail when the leads were subsequently subjected to stress during further fabrication. Even where the silver wire is work hardened to increase its yield strength, it recrystallizes and softens when heated to elevated fabrication temperatures. Other lead materials would oxidize and could not be subsequently joined easily to junctures in an electrical circuit. The same problems prevailed when the capacitor was encapsulated in glass to seal it hermietically against the environment as this also required fairly high fabrication temperatures.

I have now discovered a wrought silver-base alloy connector which will resist elevated fabrication temperatures and will exhibit the desired strength when the electronic components of which it is a part is heated to such fabrication temperatures as 500° C. and higher.

It is thus an object of my invention to provide a wrought silver-base palladium alloy connector characterized by an improved combination of physical properties at elevated fabrication temperature.

Another object is to provide an electrical component comprising an electric conductive element having a lead connector extending therefrom formed of a wrought silver-palladium alloy containing up to about 20% palladium.

A further object is to provide a miniaturized impedance component comprising a non-metallic member and an electrically conductive element associated therewith, wherein the electrically conductive element has extending therefrom a lead connector formed of a work hardened silver-palladium alloy containing up to about 20% by weight of palladium.

As an additional object, I provide a lead connector of a silver-palladium alloy having an adherent coating of a metal, such as silver or gold of good electrical conductivity.

It is also an object to provide a method of fabricating an electrical component at an elevated temperature utilizing a lead connector of a silver-palladium alloy.

These and other objects will more clearly appear when taken in conjunction with the following disclosure and the accompanying drawing, wherein.

Figure 1:
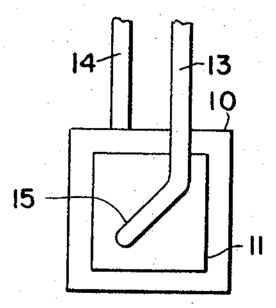
FIGS. 1 to 3 illustrate one embodiment of an electrical component comprising a capacitor in which the alloy connector of the invention is employed.

Stating it broadly, my invention comprises an electrical connector for use in electrical components, such as capacitors, inductors, resistors, and the like, comprising a wrought silver-base alloy containing up to about 20% by weight of palladium. I have found that a wire connector made of the foregoing alloy composition has high resistance to oxidation at elevated temperatures and tends to retain adequate strength when subjected to elevated fabrication temperature ranging up to about 700° C. The alloy composition permits use of special firings and elevated temperature treatments of components, particularly capacitors and their enclosures, without undue weakening of the connections. In the form of wire or foil, the alloy composition permits bake out and module connections to be conducted at elevated temperatures. By the term "connector" is meant such wrought shapes as wire, foil, strip, tubing, and other wrought shapes having utility as electrical connectors in electrical components. For my purposes, I prefer the connector be in the wrought work hardened state, although the alloy at the higher level of palladium may be used in the annealed state.

In its broad aspects, the electrical component to which the inventon is applicable may comprise an electrically conductive element having a lead connector extending therefrom. In its more preferred aspects, the lead connector of the invention may be an element of an impedance component comprising a non-metallic member, for example a ceramic wafer, having an electrically conductive element associated therewith to which the lead connector is attached.

I find that by working over the composition range of up to 20% palladium, I assure a connector having a desired combination of physical properties together with good electrical conductivity. For example, a silver-base alloy containing 3% Pd has an electrical conductivity of about 60% of standard (IACS), an annealed hardness of 48 (Rockwell 15T) and, when work hardened, a hardness of about 80. This alloy has high oxidation resistance at elevated temperature and wire connectors made of the alloy tend to retain the strength due to work hardening at elevated fabricating temperatures, such as 400° C., 500° C., 600° C., etc. While pure silver can be work hardened to 75 Rockwell 15T, it softens drastically at fabricating temperatures of 300° C. and above and exhibits low strength.

Generally speaking, the novel alloy connector will exhibit an electrical conductivity of at least 20% of the standard (IACS). For example, a silver alloy containing 10% Pd exhibits an electrical conductivity of 30%, an annealed hardness of 62 Rockwell 15T, and, in the work hardened state, a hardness of 82. Large amounts of palladium above 20% adversely affect the conductivity of the alloy; for example, at 30% Pd, the conductivity is 12%, while at 40% Pd, the conductivity is reduced to the low value of 8%.

It is thus apparent, that by working with palladium in amounts up to about 20%, I assure an electrical connector having the desired combination of electrical and physical properties for my purposes, especially when employed in the production of miniaturized impedance components. Generally, the composition of the alloy will comprises a small but effective amount of palladium ranging up to about 20% with the balance consisting essentially of silver, it being understood that other elements such as Pt, Rh, Ir, Ru, Ni, Cu, etc., may be present in amounts which do not substantially adversely affect the desired combination of electrical and physical properties of the alloy. Preferably, the composition may range from about 3% to 20% Pd, with the balance consisting essentially of silver. By working over the foregoing composition ranges, a lead connector is provided having in combination the desired hardness, strength, resistance to oxidation and softening at elevated temperature together with adequate electrical properties. Compositions I have tried include wrought work hardened connector alloys comprising about 97% Ag-about 3% Pd; about 95% Ag-about 5% Pd; about 90% Ag-about 10% Pd; and about 80% Ag-about 20% Pd.

Figure 2:
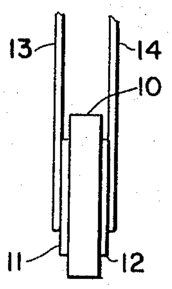
Figure 3:
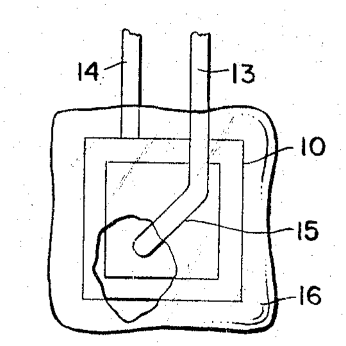

As illustrative of the use of the invention, reference is made to FIGS. 1 to 3 which show a miniaturized capacitor comprising a thin ceramic substrate or wafer 10 of suitable dielectric material upon which the metallic film layers 11 and 12 of suitable conductive material, e.g. silver, platinum, copper, is deposited to form capacitor plates. The dielectric material may be rectangular, circular, cylindrical or any convenient shape. As a miniaturized capacitor, the wafer may be about 0.005" thick and a square about ¼ inch on the side. The deposited film may be about 0.001 inch thick. The film may be applied by any suitable process such as, for example, by evaporation, sputtering, pyrolitic deposition, displacement from solution, spraying, or a painting. After an adherent metallic film has been obtained, lead connectors 12 and 13 of the special alloy are connected to the metallic film. Referring to FIG. 1, lead connector 13 is shown flattened at its end 15 which is then resistance welded or cemented with a conductive cement to metallic film 11, lead 14 being similarly welded to metallic film 12. After the leads have been joined to the capacitor plates, the completed capacitor is then encapsulated in a protective coating 16 of glass at an elevated temperature. If the connectors were made of work hardened silver, they would soften drastically under such treatment and lack the proper combination of physical properties. Silver hardened with copper would not be desirable as it exhibits low resistance to oxidation at elevated temperature. An alloy connector of 97% Ag and 3% Pd, on the other hand, has the desirable combination of electrical and physical properties for the purpose. In place of glass, the capacitor may be encapsulated in polytetrafluoroethylene or a chlorinated fluorocarbon to protect it against the environment.

Figure 4:
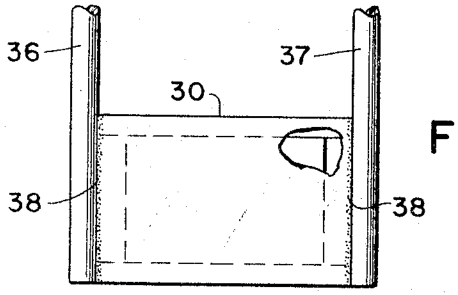
FIGS. 4 and 5 are illustrative of another embodiment of a capacitor, FIG. 5 being an end view of FIG. 4.
Figure 5:
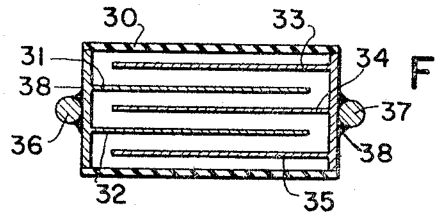

Another embodiment of a capacitor utilizing the connector of my invention is that depicted in FIGS. 4 and 5 which shows a rectangularly shaped ceramic dielectric 30 having encapsulated therein a set of electrode plates

31 and 32 connected by a braze, or weld, or cement 38 to lead 36 of a 95% Ag-5% Pd alloy and another set of electrode plates 33, 34 and 35 in interleaving relationship with the other plates and also solder connected to lead 37 of the same silver-palladium composition.

Figure 6:
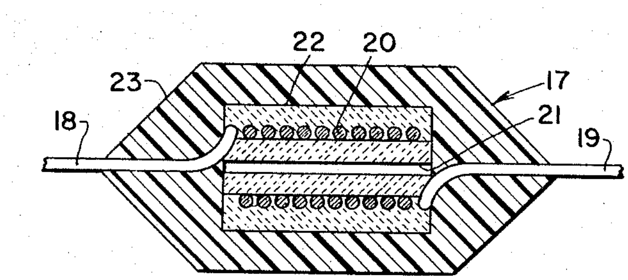
FIG. 6 depicts an inductor utilizing the alloy connector provided by the invention.

Another electrical component in which the alloy connector may be employed is shown in FIG. 6 comprising an inductor 17. It will be noted that in this embodiment, the leads 18 and 19 are merely extensions of the coil 20 which is constructed of the same alloy. The inductor here illustrated comprises a hollow cylindrical core 21 of soft ferrite material around which a wire of diameter of 0.005" to 0.01" of the alloy composition 97% Ag and 3% Pd is wound with free ends 18 and 19 being provided as the leads. The core and coil is then coated with a slurry of similar soft ferrite material to form an outer cylindrical shell 22 which is baked by heating at an elevated temperature of about 700° C. to 1000° C., at which temperature a silver connector would drastically soften and weaken. Thereafter, the inductor may be encapsulated within a dielectric material 23, such as polytetrafluoroethylene. The core of the inductor may be one having a length of about ¼ inch, an outside diameter of about 0.1 inch and a hole of about 0.02 inch in diameter.

Figure 7:
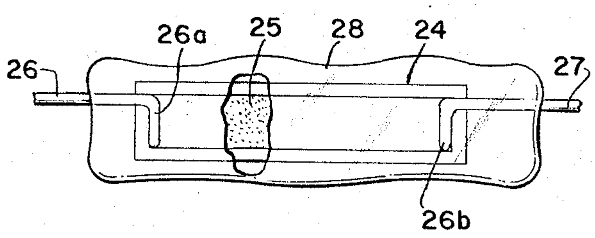
FIG. 7 illustrates the use of the alloy connector of the invention as employed in the production of thin film resistors.

FIG. 7 shows a thin film resistor comprising a dielectric ceramic substrate 24 having deposited thereon a thin metallic film 25 of, for example, platinum, palladium or precious metal alloys to which leads 26 and 27 of the alloy are connected at ends **26*a* and 26*b*, respectively, the resistor being encapsulated in a glass coating 28** as shown.

Figure 8:
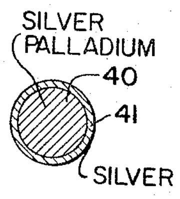
FIG. 8 is an enlarged cross section of one embodiment of the connector showing a coating of silver on the surface of a Ag-Pd alloy containing 90% Ag and 10% Pd.

When high electric conductivity is desired with high stiffness, I may employ a connector of Ag-Pd having a coating of oxidation resistant metal such as silver or gold. In FIG. 8, I show an enlarged cross section of a wrought wire connector 40 of about 90% Ag and 10% Pd having an adherent layer of silver 41 thereon. Gold may be employed in place of silver. Either metal may be applied to the surface by electroplating and the coating diffused into the body of the metal by heat treatment. One method would be to take a stock of the silver-palladium alloy, silver plate it followed by a diffusion heat treatment as is known in the art and then cold drawing the stock to the desired dimension for the connector. The silver or gold plating may have a thickness ranging from about 0.1% to about 50% of the thickness of the cross section of the final silver-palladium connector material.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A miniaturized impedance component comprising a non-metallic member, an electrically conductive element electrically associated with said non-metallic member, and a lead connector coupled to said electrically conductive element formed of a wrought silver-palladium alloy containing up to about 20% by weight of palladium and the balance consisting essentially of silver.

2. The miniaturized impedance component of claim 1 wherein said lead connector of wrought silver-palladium alloy is in the work hardened condition and contains about 3% to 20% by weight of palladium, with the balance consisting essentially of silver, said miniaturized impedance component being encapsulated in a dielectric.

3. The miniaturized component of claim 2 wherein the lead connector of wrought silver-palladium alloy contains about 3% to 10% by weight of palladium, with the balance consisting essentially of silver.

4. The miniaturized component of claim 1 wherein the lead connector has an adherent coating of a metal selected from the group silver and gold.

5. A method of fabricating a miniaturized impedance component which comprises providing a non-metallic member having an electrically conductive element electrically associated therewith, bonding a lead connector of a wrought silver-palladium alloy to said electrically conductive element, said alloy containing up to about 20% by weight of palladium, with the balance consisting essentially of silver, and then heating said miniaturized impedance component at a temperature which normally adversely affects a lead connector made of substantially pure silver.

6. The method of claim 5 wherein the lead connector which is bonded to the electrically conductive element is in the work hardened condition and contains 3% to 20% by weight of palladium, with the balance consisting essentially of silver, and wherein said impedance component is encapsulated in a dielectric prior to heating at said elevated temperature.

7. The method of claim 5 wherein the lead connector contains 3% to 10% by weight of palladium, with the balance consisting essentially of silver.

References Cited by the Examiner

UNITED STATES PATENTS

| | | | |
|---|---|---|---|
| 2,222,544 | 11/1940 | Spanner | 75—113 |
| 2,300,286 | 10/1942 | Gwyn | 252—514 |
| 2,793,273 | 4/1957 | Underwood | 252—514 X |
| 2,197,725 | 7/1965 | Sapoff | 174—126 X |

LEWIS H. MYERS, *Primary Examiner.*

L. E. ASKIN, *Examiner.*

E. GOLDBERG, *Assistant Examiner.*